US012537933B2

United States Patent
Cao

(10) Patent No.: US 12,537,933 B2
(45) Date of Patent: Jan. 27, 2026

(54) POTABLE MULTIFUNCTIONAL DETECTION INSTRUMENT

(71) Applicant: Zhihui Cao, Xiaogan (CN)

(72) Inventor: Zhihui Cao, Xiaogan (CN)

(*) Notice: Subject to any disclaimer, the term of this patent is extended or adjusted under 35 U.S.C. 154(b) by 0 days.

(21) Appl. No.: 19/257,494

(22) Filed: Jul. 2, 2025

(65) Prior Publication Data

US 2025/0337877 A1 Oct. 30, 2025

(51) Int. Cl.

| | |
|---|---|
| ***G01J 3/02*** | (2006.01) |
| ***G01D 11/24*** | (2006.01) |
| ***G01D 21/02*** | (2006.01) |
| ***G01J 3/10*** | (2006.01) |
| ***G01R 33/00*** | (2006.01) |
| ***G01S 3/04*** | (2006.01) |
| ***G08B 3/02*** | (2006.01) |
| ***G08B 6/00*** | (2006.01) |
| ***G08B 19/00*** | (2006.01) |
| ***H04N 17/00*** | (2006.01) |
| *G01J 3/12* | (2006.01) |

(52) U.S. Cl.

CPC .......... *H04N 17/002* (2013.01); *G01D 11/24* (2013.01); *G01D 21/02* (2013.01); *G01J 3/0264* (2013.01); *G01J 3/0272* (2013.01); *G01J 3/0291* (2013.01); *G01J 3/108* (2013.01); *G01R 33/0047* (2013.01); *G01S 3/046* (2013.01); *G08B 3/02* (2013.01); *G08B 6/00* (2013.01); *G08B 19/00* (2013.01); *G01J 3/12* (2013.01); *G01J 2003/1213* (2013.01)

(58) Field of Classification Search

CPC .. H04N 17/002; G01J 1/44; G01J 1/02; G01J 3/02; G01J 3/0264; G01J 3/0272; G01J 3/0291; G01J 3/108; G01D 11/24

See application file for complete search history.

(56) References Cited

U.S. PATENT DOCUMENTS

| | | | | |
|---|---|---|---|---|
| 2009/0027498 | A1* | 1/2009 | Owen | G08B 13/196 348/151 |
| 2016/0245798 | A1 | 8/2016 | Waga | |
| 2019/0242822 | A1 | 8/2019 | Ma et al. | |
| 2021/0085317 | A1 | 3/2021 | Miller et al. | |
| 2025/0189369 | A1* | 6/2025 | Chen | G01J 1/0271 |

FOREIGN PATENT DOCUMENTS

| | | | | | |
|---|---|---|---|---|---|
| CN | 1255200 | A | * | 5/2000 | G01S 7/4021 |
| CN | 111175847 | A | * | 5/2020 | G01V 11/00 |
| CN | 221004905 | U | * | 5/2024 | |
| CN | 221445383 | U | * | 7/2024 | G01J 1/0271 |
| DE | 102007034772 | B4 | * | 4/2016 | G06F 3/0412 |
| KR | 20240036289 | A | * | 3/2024 | G01V 8/10 |

* cited by examiner

*Primary Examiner* — Abdullahi Nur

(74) *Attorney, Agent, or Firm* — Zhigang Ma

(57) ABSTRACT

A portable multifunctional detection instrument is provided. The portable multifunctional detection instrument includes a housing. The housing is provided with a handheld part. A control circuit board is disposed in the housing. An infrared detector and a red light generator are disposed on the housing. Both the infrared detector and the red light generator are electrically connected to the control circuit board. The infrared detector is configured to detect red light emitted by a camera. The red light generator is configured to emit red light toward the camera. The control circuit board is further provided with a signal detection module to detect whether a communication signal exists around.

20 Claims, 11 Drawing Sheets

3 16 12 106 105 104 103 11 1 14

POTABLE MULTIFUNCTIONAL DETECTION INSTRUMENT

TECHNICAL FIELD

The present disclosure relates to the field of detection instruments, and in particular, to a portable multifunctional detection instrument.

BACKGROUND

A camera and other covert photographing equipment may be illegally installed in a public toilet or a hotel room to steal privacy information of a photographed person. This is a social problem that has always been troubled. In addition, as electronic device technologies are improved, functions of covert photographing cameras are increasingly diversified. For example, while the covert photographing camera has a basic photographing function, the covert photographing camera may further have a fill light of red light, so as to implement a photographing function at night. The covert photographing camera further may have a wireless transmission function, so as to send and transmit a video obtained by means of photographing to the outside. The covert photographing camera further may have a recording function, and may also implement recording while photographing a video. The covert photographing camera may further have a magnetic suction installation function, so that the camera may be conveniently installed on various metal parts, so as to facilitate covert photographing. However, because a conventional detection instrument has a relatively single function, it is difficult to find a hidden camera in a detection process. In addition, the conventional detection instrument is very large, inconvenient to carry, and expensive. For ordinary consumers, purchase cost burden is heavy.

SUMMARY

To overcome the disadvantages in the prior art, the present disclosure provides a portable multifunctional detection instrument.

The technical scheme adopted for solving the technical problem of the present disclosure is as follows.

The present disclosure provides a portable multifunctional detection instrument. The portable multifunctional detection instrument includes a housing. The housing is provided with a handheld part. A control circuit board is disposed in the housing. An infrared detector and a red light generator are disposed on the housing. Both the infrared detector and the red light generator are electrically connected to the control circuit board. The infrared detector is configured to detect red light emitted by a camera. The red light generator is configured to emit red light toward the camera. The control circuit board is further provided with a signal detection module to detect whether a communication signal exists around.

A battery is disposed in the housing, and the battery is electrically connected to the control circuit board to supply power to the control circuit board.

The detection instrument further includes a prompter. The prompter is disposed on the control circuit board. When the signal detection module detects the communication signal, the prompter is able to give a warning.

The signal detection module includes an antenna module and a signal detection processing module. Both the antenna module and the signal detection processing module are disposed on the control circuit board. The antenna module is electrically connected to the signal detection processing module.

When the infrared detector detects the red light, the prompter may give a warning.

An infrared detection processing module is disposed on the control circuit board, and the infrared detection processing module is electrically connected to the infrared detector.

The detection instrument further includes a filter configured to be used by a user to observe a camera by using the light filter.

A wavelength of light allowed to pass through the light filter is 600 nm to 1100 nm.

A slide cover is disposed on the housing. The light filter is disposed on the slide cover. When the slide cover slides to open, the light filter is staggered from the housing, so that the user is able to observe the camera by using the light filter.

When the slide cover slides to close, the slide cover is accommodated in the housing, and the slide cover covers the red light generator. When the slide cover slides to open, the light filter is staggered from the housing, so that the red light generator is exposed.

The red light generator is an LED (light emitting diode) red light lamp.

The detection instrument further includes a magnetic detector. The magnetic detector is electrically connected to the control circuit board to detect whether a magnetic member exists around.

A magnetic detection processing module is disposed on the control circuit board, and the magnetic detection processing module is electrically connected to the magnetic detector.

When the magnetic detector detects the magnetic member, the prompter is able to give a warning.

The detection instrument further includes a conductive hose. A first end of the conductive hose is provided with a first connection terminal. The magnetic detector is disposed at a second end of the conductive hose. A second connection terminal is disposed on the housing. The second connection terminal is electrically connected to the control circuit board.

The second end of the conductive hose is further provided with an LED fill light.

The detection instrument further includes an ultrasonic generator, and the ultrasonic generator is electrically connected to the control circuit board to emit ultrasonic waves to the outside so as to disturb recording.

An ultrasonic processing module is disposed on the control circuit board, and the ultrasonic processing module is electrically connected to the ultrasonic generator.

Ultrasonic generators are disposed on a left side surface, a right side surface and a bottom surface of the housing.

A vibration sensor is further disposed in the housing. The vibration sensor is electrically connected to the control circuit board. When the vibration sensor detects vibration, the prompter is able to give a warning.

The prompt is a buzzer.

The present disclosure has the following beneficial effects. The infrared detector, the red light generator, and the signal detection module are integrated into the detection instrument of the present patent by using the foregoing structural arrangement. When in use, detection may be performed by using the handheld part held in the housing of the detection instrument. In a detection process, if it is found that the red light is detected by the infrared detector, a camera may highly exist in a detection space. In addition, the red light emitted by the red light generator may be irradiated in the detection space. If a camera exists in the detection space, a lens of the camera may reflect the red light well under red light irradiation, and the user may easily find presence of the camera. In addition, if the signal detection module detects that a communication signal exists around, a camera may highly exist in the detection space.

In conclusion, the detection instrument in the present patent is integrated with multiple manners that can detect a camera, so as to implement multi-dimensional detection, effectively cope with a case in which camera functions are diversified, and better protect privacy of the user. In addition, the detection instrument is easy to carry, convenient to use, and low in price, which facilitates popularization and application.

BRIEF DESCRIPTION OF THE DRAWINGS

To describe the technical schemes in the embodiments of the present discourse more clearly, the following briefly describes the attached figures required for describing the embodiments. The attached figures in the following descriptions show merely some embodiments of the present disclosure, and a person of ordinary skill in the art may derive others drawings from these attached figures without creative efforts.

The description of the present disclosure is further described in conjunction with the attached figures and embodiments.

DETAILED DESCRIPTION OF THE EMBODIMENTS

Figure 1:
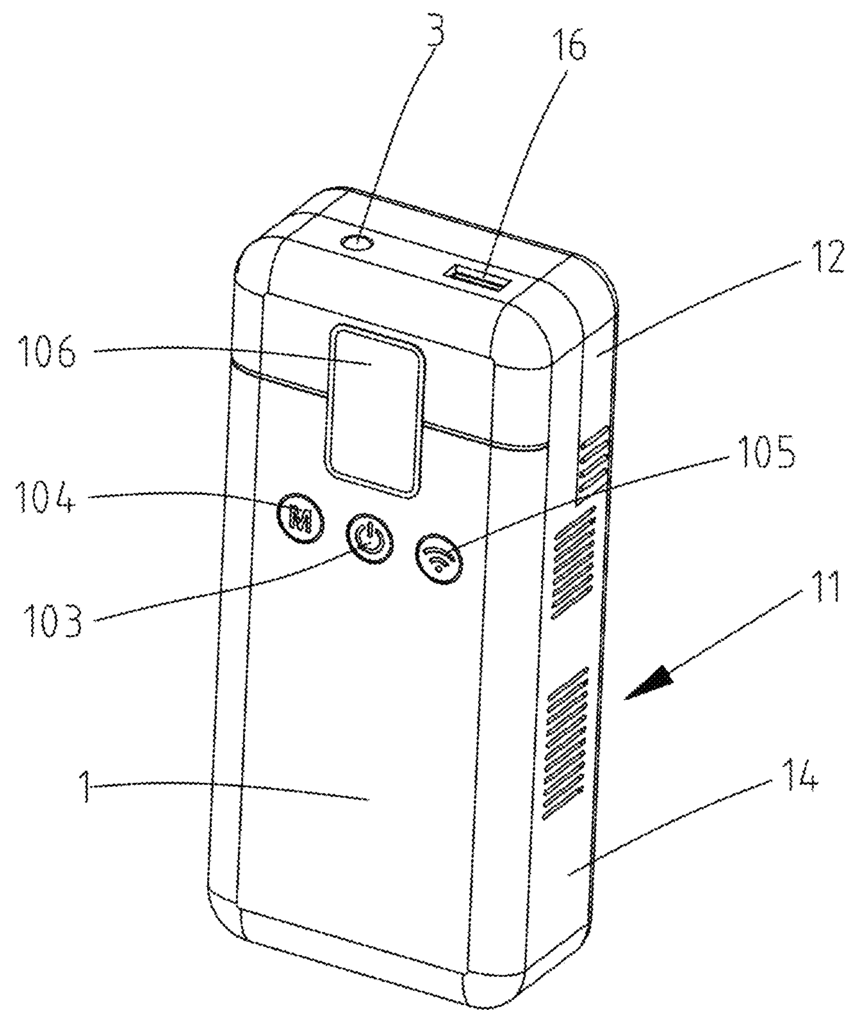
FIG. 1 is a schematic structural diagram of a detection instrument.
Figure 2:
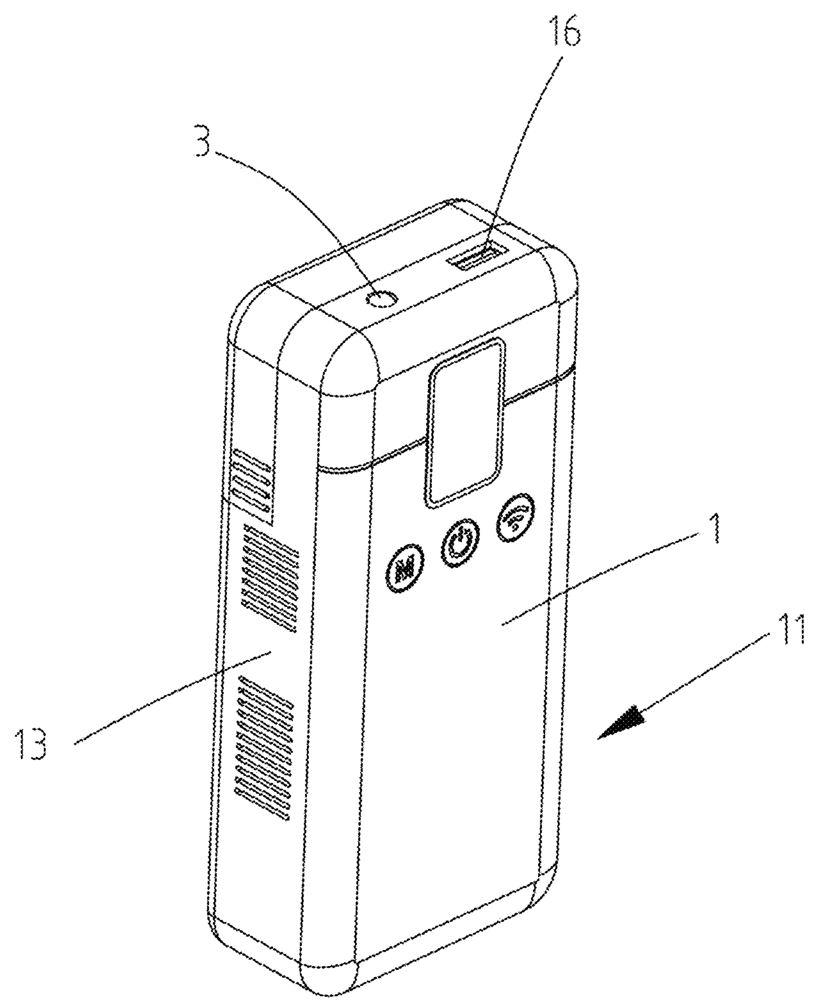
FIG. 2 is a schematic structural diagram of a detection instrument at different angles.
Figure 3:
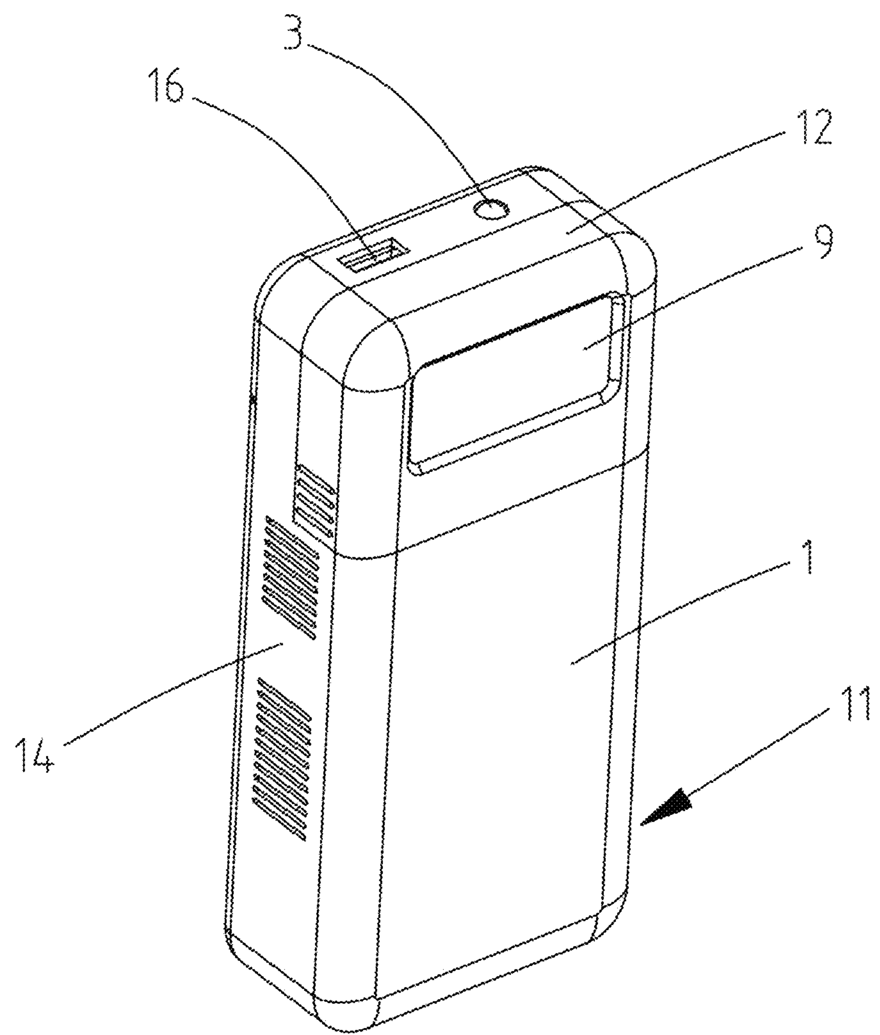
FIG. 3 is a schematic structural diagram of a detection instrument at different angles.
Figure 4:
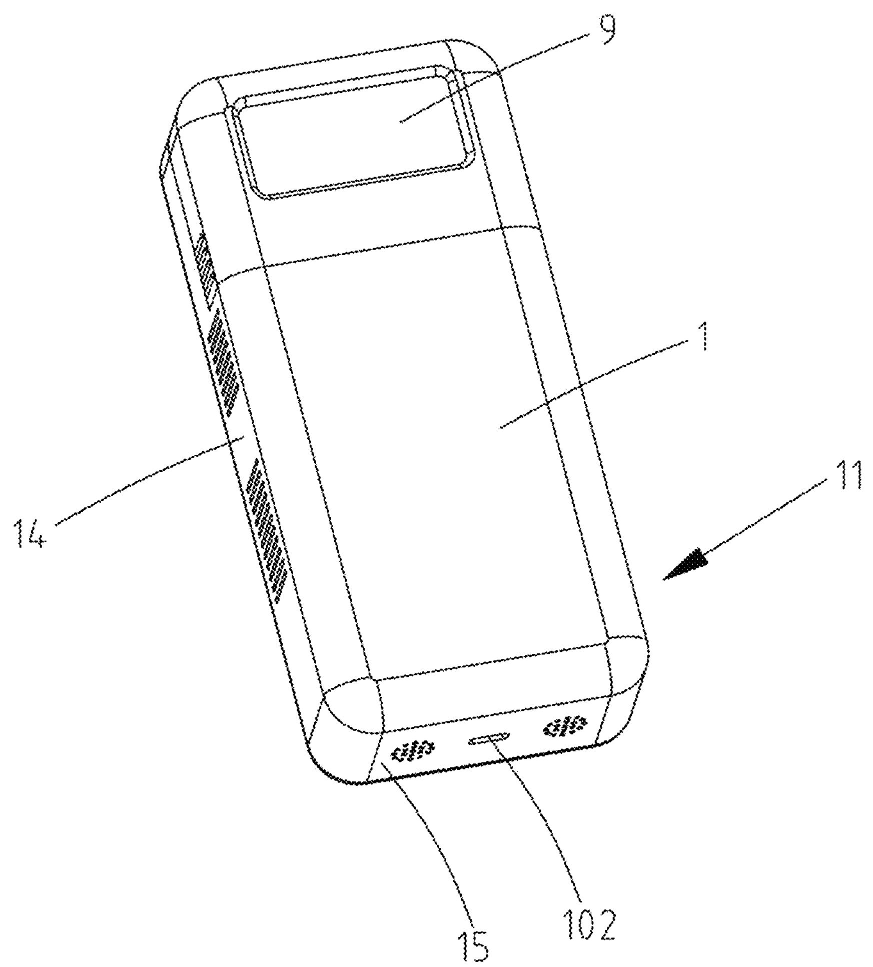
FIG. 4 is a schematic structural diagram of a detection instrument at different angles.
Figure 5:
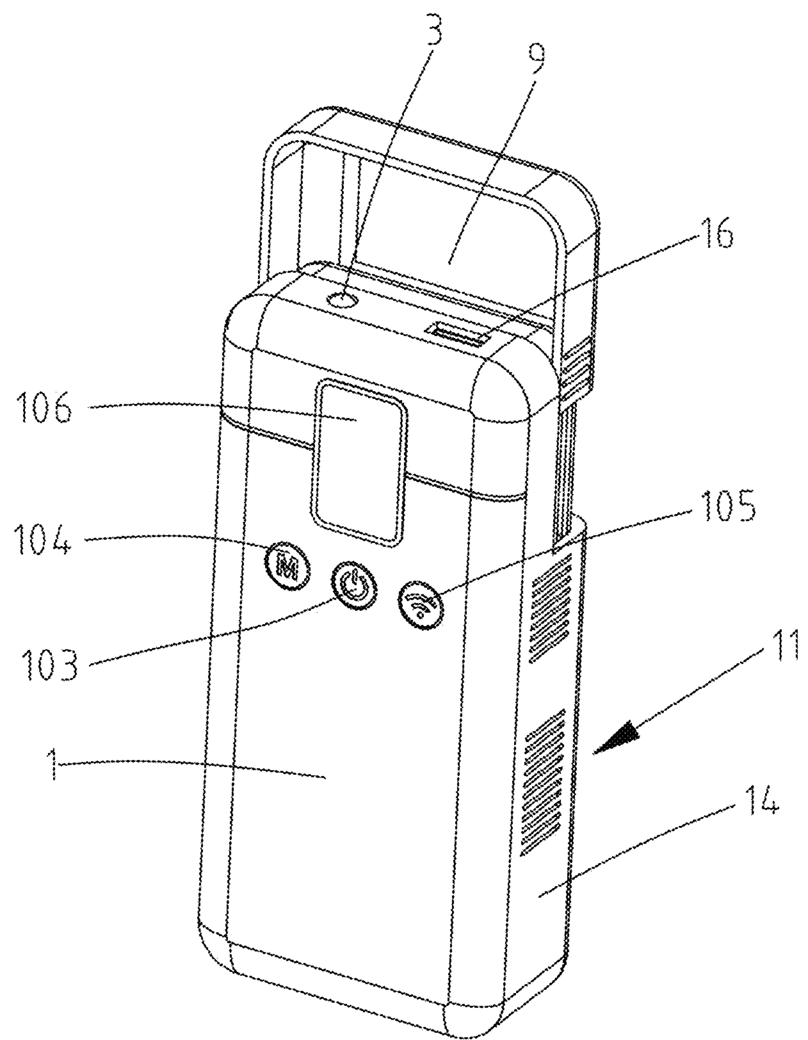
FIG. 5 is a schematic diagram of splitting in FIG. 1.
Figure 6:
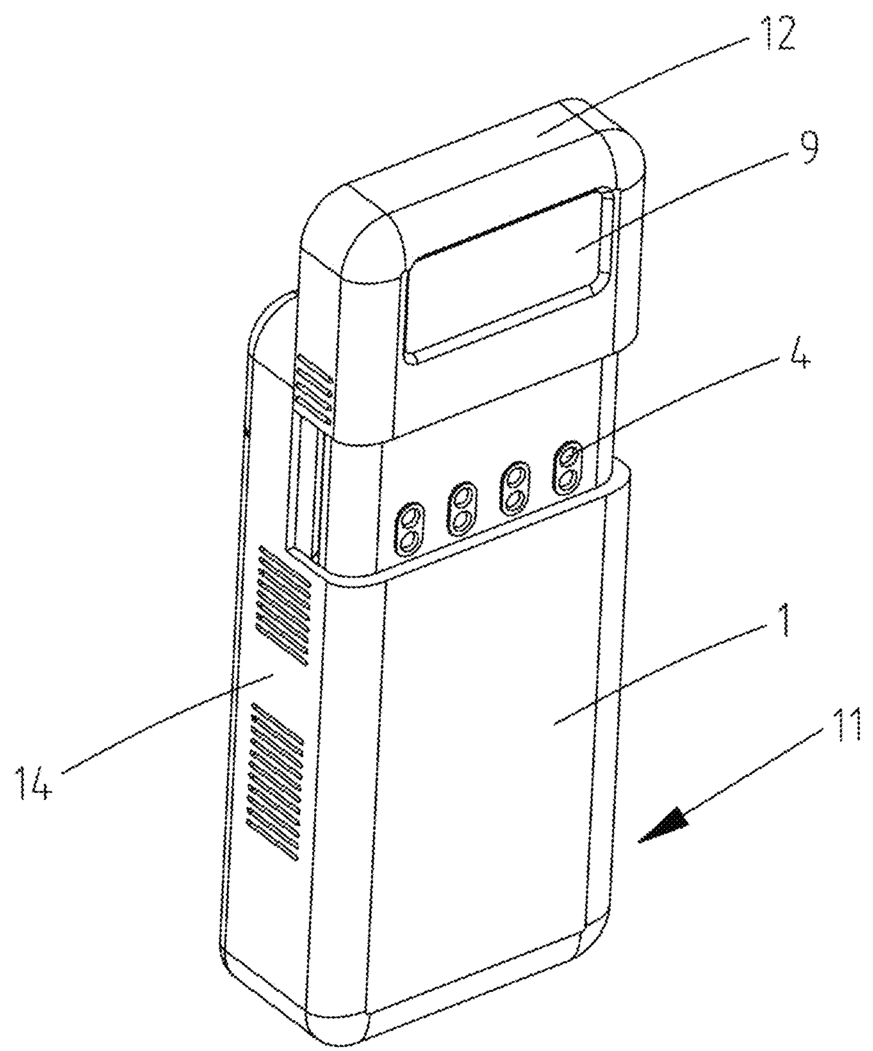
FIG. 6 is a schematic diagram of splitting in FIG. 2.
Figure 7:
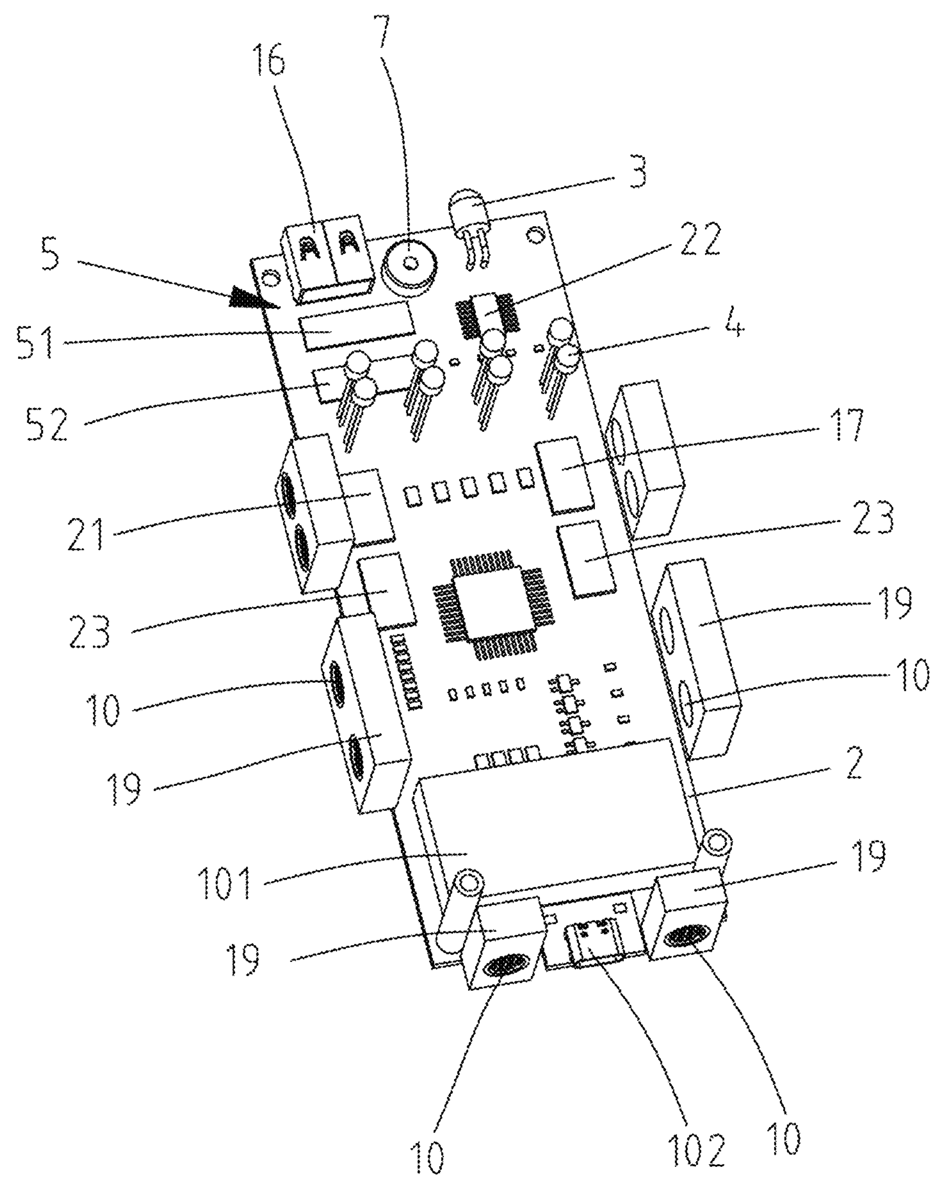
FIG. 7 is a schematic structural diagram that a housing is omitted in FIG. 4.
Figure 8:
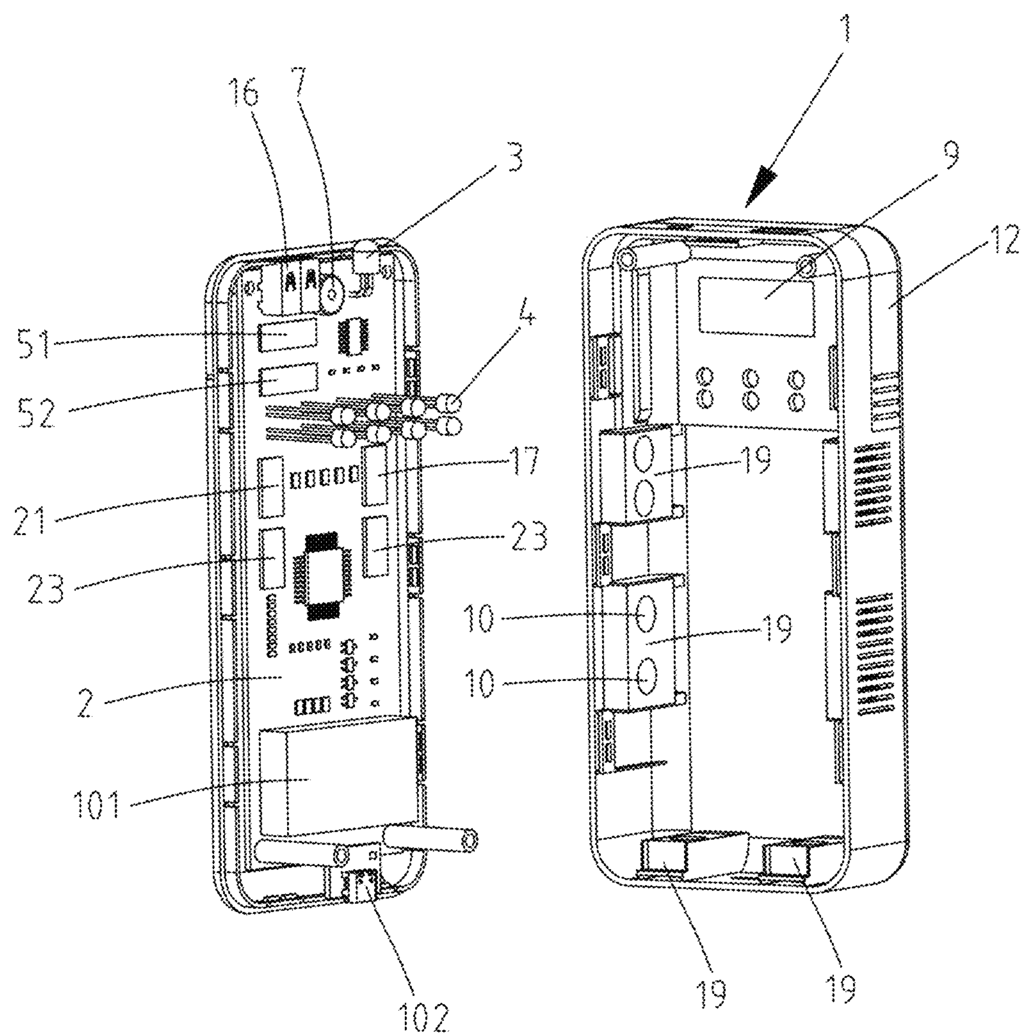
FIG. 8 is a schematic structural diagram that a housing of a detection instrument is opened.
Figure 9:
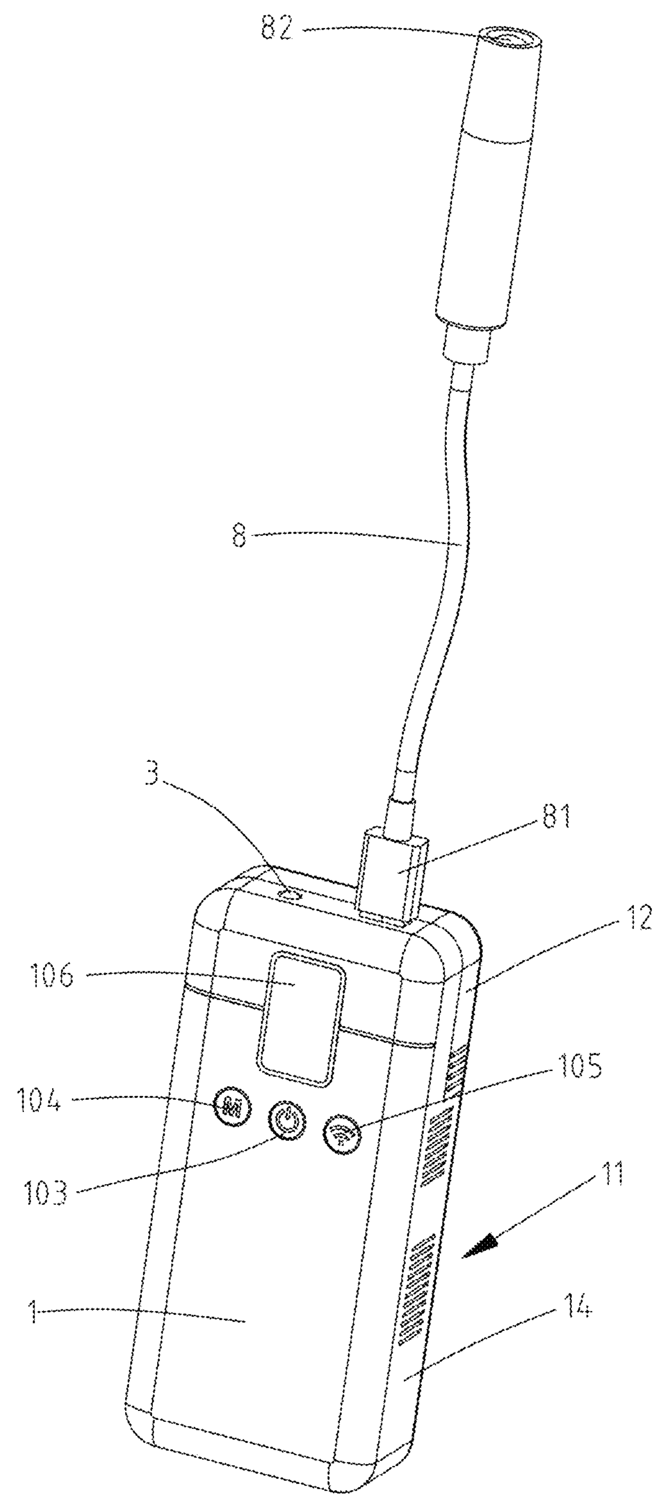
FIG. 9 is a schematic structural diagram that a conductive hose is assembled in FIG. 1.
Figure 10:
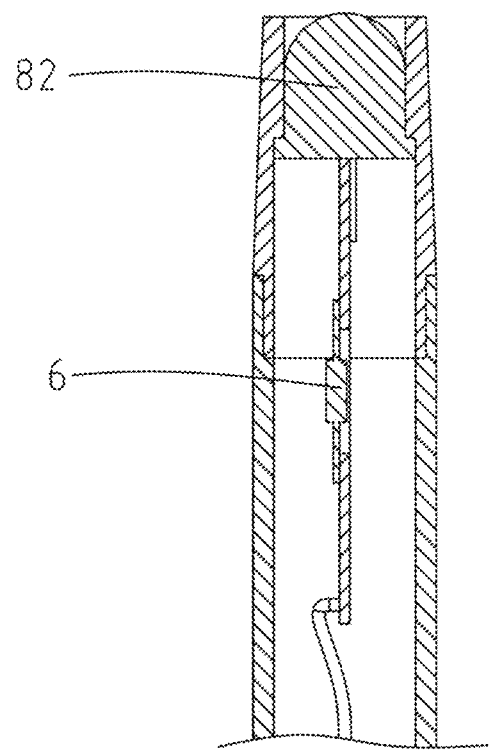
FIG. 10 is a section view of a second end of a conductive hose.
Figure 11:
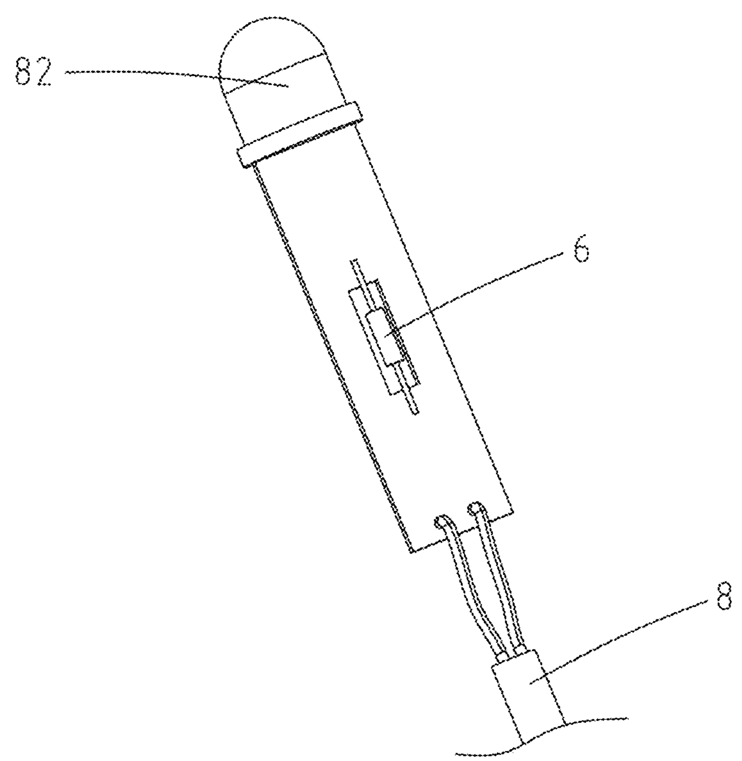
FIG. 11 is a schematic structural diagram of a magnetic detector and an LED fill light.

Referring to FIG. 1 to FIG. 11, a portable multifunctional detection instrument includes a housing 1. The housing 1 is provided with a handheld part 11. A control circuit board 2 is disposed in the housing 1. An infrared detector 3 and a red light generator 4 are disposed on the housing 1. Both the infrared detector 3 and the red light generator 4 are electrically connected to the control circuit board 2. The infrared detector 3 is configured to detect red light emitted by a camera. The red light generator 4 is configured to emit red light toward the camera. The control circuit board 2 is further provided with a signal detection module 5 to detect whether a communication signal exists around.

The infrared detector, the red light generator, and the signal detection module are integrated into the detection instrument of the present patent by using the foregoing structural arrangement. When in use, detection may be performed by using the handheld part held in the housing of the detection instrument. In a detection process, if it is found that the red light is detected by the infrared detector, a camera may highly exist in a detection space. The infrared detector may be an infrared sensor.

In addition, the red light emitted by the red light generator may be irradiated in the detection space. If a camera exists in the detection space, a lens of the camera may reflect the red light well under red light irradiation, and a user may easily find presence of the camera. The red light generator 4 is an LED (light emitting diode) red light lamp.

In addition, if the signal detection module detects that a communication signal exists around, a camera may highly exist in the detection space. The signal detection module may be a radio frequency signal detection module, is configured to detect a radio frequency signal, and may specifically cover detection of a 2G/3G/4G/5G full-band signal. Further, the radio frequency signal detection module has high, middle, and low detection sensitivity, and the user may switch the detection sensitivity based on an actual requirement. In addition, a corresponding signal sounding sensitivity adjustment button is disposed on the housing. For example, a high detection sensitivity indicates that a signal with relatively weak signal strength can be detected. A middle detection sensitivity indicates that a signal with general signal strength can be detected. A low detection sensitivity indicates that strong signal strength is required for detection. In addition, the housing further has a display configured to display strength of a detected signal.

In addition, in an actual use process, the signal detection module may be further configured to detect a hidden wifi router, a hidden GPS locator, a GSM tracker, and the like.

In conclusion, the detection instrument in the present patent is integrated with multiple manners that can detect a camera, so as to implement multi-dimensional detection, and effectively cope with a case in which camera functions are diversified. In addition, as described above, the detector may further be used for extension to better protect the privacy of the user. In addition, the detection instrument is easy to carry, convenient to use, and low in price, which facilitates popularization and application.

In some embodiments, the detection instrument further includes a prompter 7. The prompter 7 is disposed on the control circuit board 2. When the signal detection module 5 detects the communication signal, the prompter 7 is able to give a warning that a camera exists to the user. In addition, the prompt is may be a buzzer.

The signal detection module 5 includes an antenna module 51 and a signal detection processing module 52. Both the antenna module 51 and the signal detection processing module 52 are disposed on the control circuit board 2. The antenna module 51 is electrically connected to the signal detection processing module 52. The antenna module is configured to receive a communication signal that exists around. The signal detection processing module cooperates with identification and processing, and feeds back a signal to the control circuit board (the prompter), so that the prompter is able to give a warning.

In some embodiments, when the infrared detector 3 detects the red light, the prompter 7 sends a warning that a camera exists to the user.

An infrared detection processing module 22 is disposed on the control circuit board 2, and the infrared detection processing module 22 is electrically connected to the infrared detector 3. The infrared detector is configured to receive the red light around. The infrared detection processing module cooperates with identification and processing, and feeds back a signal to the control circuit board (the prompter), so that the prompter can give a warning.

In some embodiments, the detection instrument further includes a light filter 9, so that when the user observes the camera by using the light filter 9, the light besides the red light can be filtered. When the red light generator is used for detection, the hidden camera can be easily found with the use of the light filter, and the use effect is better. Specifically, a wavelength of light allowed to pass through the light filter 9 is 600 nm to 1100 nm. The light filter is a red light filter.

A slide cover 12 is disposed on the housing 1. The light filter 9 is disposed on the slide cover 12. When the slide cover 12 slides to open, the light filter 9 is staggered from the housing 1, so that the user is able to observe the camera by using the light filter 9. The detection instrument is simple in structure and convenient to use.

Further, when the slide cover 12 slides to close, the slide cover 12 is accommodated in the housing 1, and the slide cover 12 covers the red light generator 4. When the slide cover 12 slides to open, the light filter 9 is staggered from the housing 1, so that the red light generator 4 is exposed. In this way, the arrangement of the detection structure is more reasonable, and the shape integrality is higher.

In some embodiments, the detection instrument further includes a magnetic detector 6. The magnetic detector 6 is electrically connected to the control circuit board 2 to detect whether a magnetic member exists around. In the prior art, an internal structure of the camera may include a magnet, and installation of the camera may also be performed by using the magnet for adsorption and fixation. Therefore, in a process of detecting the camera, the magnetic detector may be used to detect the camera in which the magnet exists, so as to enrich a detection method for the camera. In addition, in an actual use process, the detection module may be further configured to detect a magnetically fixed GPS locator, a magnetically fixed GSM tracker, and the like.

A magnetic detection processing module 21 is disposed on the control circuit board 2, and the magnetic detection processing module 21 is electrically connected to the magnetic detector 6. Moreover, when the magnetic detector 6 detects the magnetic member, the prompter 7 is able to give a warning. Specifically, the magnetic detector is configured to detect the magnetic member around. The magnetic detection processing module cooperates with identification and processing, and feeds back a signal to the control circuit board (the prompter), so that the prompter can give a warning.

Further, the detection instrument further includes a conductive hose 8. A first end of the conductive hose 8 is provided with a first connection terminal 81. The magnetic detector 6 is disposed at a second end of the conductive hose 8. A second connection terminal 16 is disposed on the housing 1. The second connection terminal 16 is electrically connected to the control circuit board 2. In this way, the magnetic detector may be electrically connected to the control circuit board by using the conductive hose, so that the magnetic detector may be extended and detected by using the conductive hose. Especially, when the camera is in a hidden position such as a corner, the structure may better cooperate with detection. The conductive hose may be a hose on an outer layer, and a wire is disposed in the hose for electrical conduction. Both the first connection terminal and the second connection terminal are USB interfaces.

Further, the second end of the conductive hose 8 is further provided with an LED fill light 82, which is more convenient for detection of the hidden position. The detection instrument is simple in structure and convenient to use.

In some embodiments, the detection instrument further includes an ultrasonic generator 10, and the ultrasonic generator 10 is electrically connected to the control circuit board 2 to emit ultrasonic waves to the outside so as to disturb recording. Because many cameras have a recording function, the ultrasonic waves are emitted by using the ultrasonic generator, so that recording can be interfered well, and the user is further protected, so as to prevent privacy leakage. In addition, an installation rack 19 of the ultrasonic generator is disposed in the housing, so as to be used for installation of the ultrasonic generator. The installation rack is installed in a slot of the housing.

Further, an ultrasonic processing module 23 is disposed on the control circuit board 2, and the ultrasonic processing module 23 is electrically connected to the ultrasonic generator 10. The ultrasonic processing module may control the ultrasonic generator, so as to facilitate operation of the user.

Further, ultrasonic generators 10 are disposed on a left side surface 13, a right side surface 14 and a bottom surface 15 of the housing 1, so that the ultrasonic waves can be emitted to the outside by 270 degrees to form effective coverage of recording disturbance. The numbers of the ultrasonic generators may be four on the left side surface, four on the right side surface, and two on the bottom surface. Correspondingly, the numbers of the installation racks are two on the left side surface, two on the right side surface, and two on the bottom surface.

In some embodiments, a vibration sensor 17 is further disposed in the housing 1. The vibration sensor 17 is electrically connected to the control circuit board 2. When the vibration sensor 17 detects vibration, the prompter 7 is able to give a warning. Specifically, when the vibration detector detects vibration, the vibration detection processing module 18 on the control circuit board cooperates with identification and processing, and feeds back a signal to the control circuit board (prompter), so that the prompter can give a warning.

In addition, the detection instrument in this patent is generally used in a scenario such as a public lavatory or a hotel, and particularly, in a hotel scenario, the detection instrument may hang on a door. When the door is opened, the vibration sensor may detect vibration, and the prompter prompts a warning. The user may learn that the door is opened, so as to further protect the user.

In this patent, the housing may be formed by relative splicing of a first housing and a second housing. A battery 101 is disposed in the housing, and the battery is electrically connected to the control circuit board to supply power to the control circuit board. A charging port 102 of the battery is further disposed on the control circuit board. In addition, a switch button 103, a mode switching button 104, a signal detection sensitivity adjustment button 105, and a display 106 are further disposed on the housing. The mode switching may be represented as use switching between the multiple foregoing detection manners.

As described above, one or more embodiments are provided in combination with concrete content, and the specific implementation of the present disclosure is not intended to be limited to these descriptions. Approximate and similar methods and structures in the present disclosure, or a plurality of technical deductions and substitutions can be made without departing from the concept of the present disclosure, and should be regarded as the scope of protection of the present disclosure.

What is claimed is:

1. A portable multifunctional detection instrument, comprising a housing (1), wherein the housing (1) is provided with a handheld part (11), a control circuit board (2) is disposed in the housing (1), an infrared detector (3) and a red light generator (4) are disposed on the housing (1), both the infrared detector (3) and the red light generator (4) are electrically connected to the control circuit board (2), the infrared detector (3) is configured to detect red light emitted by a camera, the red light generator (4) is configured to emit red light toward the camera, and the control circuit board (2) is further provided with a signal detection module (5) to detect whether a communication signal exists around.

2. The portable multifunctional detection instrument according to claim 1, wherein a battery (101) is disposed in the housing (1), and the battery (101) is electrically connected to the control circuit board (2) to supply power to the control circuit board.

3. The portable multifunctional detection instrument according to claim 2, further comprising a prompter (7), wherein the prompter (7) is disposed on the control circuit board (2), and when the signal detection module (5) detects the communication signal, the prompter (7) may give a warning.

4. The portable multifunctional detection instrument according to claim 3, wherein the signal detection module (5) comprises an antenna module (51) and a signal detection processing module (52), both the antenna module (51) and the signal detection processing module (52) are disposed on the control circuit board (2), and the antenna module (51) is electrically connected to the signal detection processing module (52).

5. The portable multifunctional detection instrument according to claim 3, wherein when the infrared detector (3) detects the red light, the prompter (7) may give a warning.

6. The portable multifunctional detection instrument according to claim 5, wherein an infrared detection processing module (22) is disposed on the control circuit board (2), and the infrared detection processing module (22) is electrically connected to the infrared detector (3).

7. The portable multifunctional detection instrument according to claim 1, further comprising a filter (9), configured to be used by a user to observe a camera by using the light filter (9).

8. The portable multifunctional detection instrument according to claim 7, wherein a wavelength of light allowed to pass through the light filter (9) is 600 nm to 1100 nm.

9. The portable multifunctional detection instrument according to claim 7, wherein a slide cover (12) is disposed on the housing (1), the light filter (9) is disposed on the slide cover (12), and when the slide cover (12) slides to open, the light filter (9) is staggered from the housing (1), so that the user is able to observe the camera by using the light filter (9).

10. The portable multifunctional detection instrument according to claim 9, wherein when the slide cover (12) slides to close, the slide cover (12) is accommodated in the housing (1), and the slide cover (12) covers the red light generator (4); and when the slide cover (12) slides to open, the light filter (9) is staggered from the housing (1), so that the red light generator (4) is exposed.

11. The portable multifunctional detection instrument according to claim 1, wherein the red light generator (4) is an LED (light emitting diode) red light lamp.

12. The portable multifunctional detection instrument according to claim 3, further comprising a magnetic detector (6), wherein the magnetic detector (6) is electrically connected to the control circuit board (2) to detect whether a magnetic member exists.

13. The portable multifunctional detection instrument according to claim 12, wherein a magnetic detection processing module (21) is disposed on the control circuit board (2), and the magnetic detection processing module (21) is electrically connected to the magnetic detector (6).

14. The portable multifunctional detection instrument according to claim 12, wherein when the magnetic detector (6) detects the magnetic member, the prompter (7) is able to give a warning.

15. The portable multifunctional detection instrument according to claim 12, further comprising a conductive hose (8), wherein a first end of the conductive hose (8) is provided with a first connection terminal (81), the magnetic detector (6) is disposed at a second end of the conductive hose (8), a second connection terminal (16) is disposed on the housing (1), and the second connection terminal (16) is electrically connected to the control circuit board (2).

16. The portable multifunctional detection instrument according to claim 15, wherein the second end of the conductive hose (8) is further provided with an LED fill light (82).

17. The portable multifunctional detection instrument according to claim 1, further comprising an ultrasonic generator (10), and the ultrasonic generator (10) is electrically connected to the control circuit board (2) to emit ultrasonic waves to the outside so as to disturb recording.

18. The portable multifunctional detection instrument according to claim 17, wherein an ultrasonic processing module (23) is disposed on the control circuit board (2), and the ultrasonic processing module (23) is electrically connected to the ultrasonic generator (10).

19. The portable multifunctional detection instrument according to claim 17, wherein ultrasonic generators (10) are disposed on a left side surface (13), a right side surface (14) and a bottom surface (15) of the housing (1).

20. The portable multifunctional detection instrument according to claim 3, wherein a vibration sensor (17) is further disposed in the housing (1), the vibration sensor (17) is electrically connected to the control circuit board (2), and when the vibration sensor (17) detects vibration, the prompter (7) is able to give a warning.

* * * * *